Patented Feb. 15, 1944

2,341,523

UNITED STATES PATENT OFFICE 2,341,523

COATING COMPOSITION

Hans F. Bauer, Chicago, Ill., assignor to Stein, Hall Manufacturing Company, Chicago, Ill., a corporation of Delaware No Drawing. Application December 18, 1940, Serial No. 370,657

18 Claims. (Cl. 106—208)

This invention relates to new and improved compositions and more particularly to new and improved film-forming, coating, sizing and impregnating compositions, and a method for the preparation thereof.

It is an object of this invention to provide new and useful compositions capable of forming clear films. Another object is the provision of new and useful coating and impregnating compositions for paper, cloth and similar materials. Another object is the provision of amylaceous compositions which will form a film or coating on paper without tending to check or crack, discolor, crystalize or become too hygroscopic. Another object is the preparation of amylaceous film-forming and adhesive compositions which are substantially non-curling. Other objects will appear hereinafter.

In accomplishing these objects, in accordance with the present invention, film-forming, coating and impregnating compositions are prepared by forming an intimate dispersion of a binding agent, prefereably an amylaceous substance, with an acetate containing combined but undissociated acetic acid in its molecule, preferably sodium diacetate.

The invention will be further illustrated, but is not limited, by the following examples in which the quantities are stated in parts by weight unless otherwise indicated:

Example I

A composition was prepared by mixing together 40 parts of Hercules starch (a chlorinated corn starch), 5 parts of Royal tapioca starch (a raw starch), 15 parts of Stein, Hall white tapioca dextrin No. 3 (a dextrinized starch about 80% soluble), 40 parts of sodium diacetate (33%–35% combined acetic acid) and 50 parts of water.

The mixture was cooked to a temperature of about 175° F. for about 10 to 15 minutes until a homogeneous colloidal dispersion was obtained. The resultant composition was then allowed to cool and was coated onto paper. An excellent tenacious, continuous film was obtained.

This composition was also found to be useful as an adhesive, for example, in making the back seam of envelopes.

Example II

A composition was prepared by mixing together 25 parts of Hercules starch (a chlorinated corn starch), 5 parts of Royal tapioca starch (a raw starch), 45 parts of Stein, Hall white tapioca dextrin No. 3 (a dextrinized starch about 80% soluble), 25 parts of sodium diacetate (33%–35% combined acetic acid) and 60 parts of water.

This mixture was cooked to a temperature of about 175° for about 10 to 15 minutes until a homogeneous colloidal dispersion was obtained. The resultant composition was then allowed to cool and was coated onto paper. An excellent tenacious, continuous film was obtained.

This composition was also found to be useful as a remoistening adhesive.

Example III

A composition was prepared by mixing together 32.5 parts of Hercules starch (a chlorinated corn starch), 5 parts of Royal tapioca starch (a raw starch), 30 parts of Stein, Hall white tapioca dextrin No. 3 (a dextrinized starch about 80% soluble), 32.5 parts of sodium diacetate (33%–35% combined acetic acid) and 55 parts of water.

This mixture was cooked to a temperature of about 175° F. for about 10 to 15 minutes until a homogeneous colloidal dispersion was obtained. The resultant composition was then allowed to cool and was coated onto paper. An excellent tenacious, continuous film was obtained.

Example IV

A composition was prepared by mixing together 33 parts of Hercules starch (a chlorinated corn starch), 5 parts of Royal tapioca starch (a raw starch), 30 parts of Stein, Hall white tapioca dextrin No. 3 (a dextrinized starch about 80% soluble), 32 parts of sodium diacetate (33%–35% combined acetic acid) and 60 parts of water.

This mixture was cooked to a temperature of about 175° F. for about 10 to 15 minutes until a homogeneous colloidal dispersion was obtained. The resultant composition was then allowed to cool and was coated onto paper. An excellent tenacious, continuous film was obtained.

It will be apparent that modifications may be made in the proportions of the various components and in the use of auxiliary agents. The dextrins may be such as are derived from starches by the usual methods of conversion, for example, hydrolysis, oxidation, heating or enzymatic action. Starches and dextrins derived from wheat, rice, barley, corn, oats, rye, potato, cassava and sago may be used. In some instances, it is preferable to use mixtures of starches and dextrins in preparing the compositions herein described. In other instances, it is preferable to use mixtures of different types of starches of varying water absorptive capacities.

In making coating compositions for paper it is preferable to employ a mixture of amylaceous substances some of which have low water absorptive capacities and others of which have high water absorptive capacities. As examples of substances which have low water absorptive capacities may be mentioned Hercules starch, thin boiling starches as, for instance, a starch known in the trade as "thin boiling 90," white tapioca dextrin, about 8% to about 10% soluble, and low soluble corn dextrins (about 8% to about 15% soluble). As examples of amylaceous substances which have high water absorptive capacities may be mentioned Royal tapioca, which is high grade cassava starch, and potato starch, both of which have a water absorptive capacity of about 16 to about 18 parts of water per part of starch. Corn starch which has an absorptive capacity from about 12 to about 15 parts of water per part of starch may be employed, although it tends to give a rather short body in the adhesives. Thin boiling corn starch having an absorptive capacity of about 8 to 10 parts water per part of starch may also be used.

The term "low water absorptive capacity" is employed herein, as applied to amylaceous materials, to define amylaceous materials which will become fluid upon the addition of about 4 parts of water or less. The expression "high water absorptive capacity" is used to describe materials which will take up and become fluid when heated with about 8 parts of water or more.

It is usually preferable that a starch of low water absorptive capacity, say within the range of 1 part of starch to 2 to 3 parts of water, form the major portion of the solids present in the composition and also represent a major portion of the amylaceous materials present. If starches of high water absorptive capacity are employed, they preferably form a minor portion of the composition. Generally speaking, the amount of starch having high water absorptive capacity is preferably in the range of about 5% to about 12% of the total solids and about 8% to about 15% of the amount of starch having a low water absorptive capacity.

The total amount of sodium diacetate is preferably not greater than about 45% of the total solids. Among the other binding agents which may be employed and with which the diacetate may be dispersed are, animal glue, natural gums, e. g., gum arabic, locust bean gum, and other film-forming substances dispersible in water under acid conditions. The dispersion may include natural or synthetic resins.

While the invention has been described specifically with reference to sodium diacetate because this is practically the only salt of this type available commercially today, it is also applicable to the other acetate salts of a similar nature. A number of sodium acetate-acetic acid-water systems are known to exist as mentioned by Beilstein, 4th edition, vol. II, page 107. Solid salts containing combined but undissociated acetic acid can be prepared containing from, say, 20% to 40% available undissociated acid, but an acid sodium salt of acetic acid containing from about 25% to about 35% of available acetic acid is preferred for the purpose of this invention. The sodium diacetate now available commercially is said to contain 33% to 35% available acetic acid with a pH in 10% solution within the range of 4 to 5.5.

The various acetates containing combined but undissociated acetic acid are prepared by replacing the water in sodium acetate

$CH_3COONa.3H_2O$ by acetic acid. It is preferable to replace only a part of the water with acetic acid and the preferred compound, sodium diacetate, has the formula

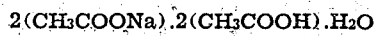
$2(CH_3COONa).2(CH_3COOH).H_2O$

Urea may be used as an auxiliary agent.

Starch gelatinizing agents, as, for example, resorcinol, chloral hydrate, sodium salicylate, calcium chloride, zinc chloride and magnesium chloride may be employed. Compounds of phenolic nature, however, sometimes suffer from the disadvantage that the compositions tend to turn dark. The compound chosen, furthermore, should preferably be one which is normally solid at ordinary temperatures and one which is not too hygroscopic. Bleaching agents may be used, for example, sodium bisulfite or sodium hydrosulfite. Fillers may be used to give body to the product, as for example, clay, kaolin, zinc oxide and the like.

In preparing the compositions, the amount of water may vary depending upon the nature and proportions of the ingredients. Less water is usually required with dextrins than with starches. For instance, a dextrin may take up from about 0.5 part to 2.0 parts of water per part of dextrin; a so-called modified starch may be capable of taking up from 2 to 15 parts of water per part of starch, and an undegenerated starch may take up about 15 to 30 parts of water to each part of starch. In general, it is preferable to use as little water as possible to obtain the desired fluid and film-forming characteristics and to produce a colloidal dispersion or solution. In making envelope adhesives it is generally preferable that the ratio of water to total solids be within the range of about 1 to 4 to 1 to 1. In making adhesives for the seams of paper bags it is preferable to use from 1 to 3.5 parts of water per part of solids. In making wall-paper adhesives it is preferable to regulate the proportions of ingredients in such a way that the water requirements in preparing the composition are about 1 to about 4 parts of water per part of blended solid ingredients.

If desired, a base material may be prepared by merely mixing together the solid ingredients in the dry state. This mixture is especially suitable for shipment as such.

It will be recognized that the time of mixing will vary depending upon the size of the batch and the efficiency of the apparatus. Usually the mixing is effected until a homogeneous gelatinous product is obtained. The temperatures employed should be below temperatures at which substantial decomposition occurs, preferably from about 140° F. to about 210° F. Atmospheric, subatmospheric or superatmospheric pressures may be employe.

The method of applying the compositions to paper or other material to be coated or impregnated may vary widely depending upon the particular composition and the particular type of material to which it is applied. Any of the well known methods of coating may be used, including well known methods of utilizing doctor blades and well known expedients such as reverse curling of the paper or other material to be coated. Good results have been obtained in utilizing compositions herein described for backing seams and as seal gums in making envelopes, particularly in making envelopes from bond paper, since these compositions appear to possess much more powerful adhesive qualities than the ordinary type of starch adhesive. As illustrated in some of the examples, certain of the compositions are excellent for coating wall-paper. The compositions are especially useful for coating flexible sheet materials since the presence of the diacetate apparently tends to inhibit or prevent curling. The compositions are not limited to use in coating or impregnating flexible sheet materials but may be used in coating, impregnating and sizing all types of fibrous materials including paper, cloth and similar materials. Likewise they may be used in coating wood, glass and metal, for example, metal cans. Good results are obtained in gluing varnished labels on cans. The compositions described may also be used in making tight wrapped boxes without warping. Since my compositions are substantially free from oxidizing agents and other substances which might prove harmful to dyes, they can readily be used in coating and impregnating dyes, paper and fabrics.

One of the advantages of the invention is that the acetate salt containing combined but undissociated acetic acid acts as a preservative for binding agents such as amylaceous substances as well as for the substance or article to which the amylaceous film or coating is applied where such substances or articles are susceptible to the growth of rope, mold or other related microorganisms. The amount of sodium diacetate for this purpose may be as small as, say, .1 to .5% based on the weight of the coating film. Much larger amounts may be employed without any adverse effect. The generic idea of employing small amounts of sodium diacetate or other water soluble complex acetate salts containing combined but undissociated acetic acid for inhibiting the growth of bacteria and molds is described and claimed in the co-pending application of Hans F. Bauer and Elmer F. Glabe, Serial No. 347,156, filed July 24, 1940.

Thus, the sodium diacetate may be incorporated in the adhesive of gummed tapes regardless of whether the adhesive is made from animal glue or vegetable glue. It may be mixed with paraffin and other wax type coating compositions for milk containers and the like. It may be used in sizing and preparing papers used in packaging dry foods, particularly papers or cardboard made from old paper and old rags. It may be used in wrapping paper, e. g., soap wrappers, glassine and butcher papers.

Amylaceous compositions containing sodium diacetate may also be used as an ingredient of foods or to coat foods including meat, sausage, cheese and all types of foods. The combination of dextrinized starch with the sodium diacetate improves the taste of foods treated with the composition as compared with the use of sodium diacetate alone.

Having thus described the invention, what I claim as new and desire to secure by Letters Patent of the United States is:

1. A coating composition comprising a water dispersible gelatinous film forming carbohydrate binding agent and a water soluble acetate alkali metal salt containing combined but undissociated acetic acid.

2. A coating composition comprising an amylaceous substance and a water soluble acetate alkali metal salt containing combined but undissociated acetic acid.

3. A coating composition consisting of a binding agent selected from the group consisting of amylaceous substances, animal glue and natural gums, and a water soluble acetate sodium salt containing combined but undissociated acetic acid, said binding agent and said salt being dispersed in water.

4. A coating composition consisting of an aqueous dispersion of an amylaceous substance and a water soluble acetate sodium salt containing combined but undissociated acetic acid.

5. A sizing, impregnating and coating composition comprising an intimate dispersion of a binding agent selected from the group consisting of amylaceous substances, animal glue and natural gums, and sodium diacetate.

6. A paper sizing and coating composition consisting of an intimate dispersion of an amylaceous substance and sodium diacetate.

7. A dry base adapted to form a coating composition when dispersed in water, said base comprising a binding agent selected from the group consisting of amylaceous substances, animal glue and natural gums, and a water soluble acetate sodium salt containing combined but undissociated acetic acid.

8. A dry base adapted to be dispersed in water to form a coating composition, said dry base consisting of a water dispersible amylaceous substance and a water soluble acetate sodium salt containing combined but undissociated acetic acid.

9. An amylaceous composition consisting essentially of a dextrinized starch and sodium diacetate.

10. An amylaceous composition comprising a dextrinized starch and a minor proportion of sodium diacetate, said sodium diacetate being the only modifying ingredient in said composition.

11. The method of preparing a coating composition which comprises dispersing a water dispersible gelatinous film forming carbohydrate binding agent in the presence of a water soluble acetate alkali metal salt containing combined but undissociated acetic acid under acid conditions.

12. The method of preparing a coating composition which comprises heating a water dispersible amylaceous substance in water with sodium diacetate at a temperature within the range of 140° F. to 210° F.

13. An amylaceous composition comprising an amylaceous adhesive base and a minor proportion of a water soluble acetate sodium salt containing combined but undissociated acetic acid.

14. An amylaceous adhesive composition comprising an amylaceous adhesive base and a minor proportion of sodium diacetate.

15. A coating composition comprising a film forming substance dispersible in water under acid conditions and a water soluble acetate alkali metal salt containing combined but undissociated acetic acid.

16. A composition of matter comprising an adhesive film forming substance dispersible in water under acid conditions to form gelatinous dispersions and a minor proportion of a water soluble acetate alkali metal salt containing combined but undissociated acetic acid.

17. A dry base adapted to form a coating composition when dispersed in water, said base comprising a film forming substance dispersible in water under acid conditions and a water soluble acetate alkali metal salt containing combined but undissociated acetic acid.

18. A dry base having adhesive properties when dispersed in water, said dry base comprising a water dispersible film forming carbohydrate adhesive substance and a water soluble acetate alkali metal salt containing combined but undissociated acetic acid.

HANS F. BAUER.